United States Patent [19]
Gregory et al.

[11] Patent Number: 5,309,029
[45] Date of Patent: May 3, 1994

[54] AIRCRAFT POWER UNIT WITH ELECTIVE MECHANICAL COUPLING

[75] Inventors: Earl M. Gregory, Centerville; James S. Tschantz, Bellbrook, both of Ohio

[73] Assignee: The United States of America as represented by the Secretary of the Air Force, Wright-Patterson Air Force Base, Ohio

[21] Appl. No.: 77,804

[22] Filed: Jun. 18, 1993

[51] Int. Cl.⁵ .............................................. B64D 41/00
[52] U.S. Cl. ................................. 290/1 R; 60/39.141; 290/4 R; 290/4 C; 244/58
[58] Field of Search ...................... 60/39.141, 39.142; 290/1 R, 4 R, 4 C; 244/58

[56] References Cited

U.S. PATENT DOCUMENTS

| | | | |
|---|---|---|---|
| 2,223,703 | 12/1940 | Potez | 290/4 C |
| 3,591,843 | 7/1971 | Friedrich | 290/4 R |
| 3,662,975 | 5/1972 | Driskill | 244/58 |
| 4,147,025 | 4/1979 | Friedrich et al. | 60/39.141 |
| 4,446,392 | 5/1984 | Jaeschke | 310/105 |
| 4,684,081 | 8/1987 | Cronin | 244/58 |
| 4,777,793 | 10/1988 | Weigund et al. | 60/39.142 |
| 4,808,869 | 2/1989 | Kopp | 310/78 |
| 4,898,000 | 2/1990 | Weigund et al. | 60/740 |
| 5,036,368 | 7/1991 | Nakamura | 335/272 |

OTHER PUBLICATIONS

P. R. Wood & W. W. Spragins, Integrated Secondary Power System (ADS), Oct. 4-8, 1965, pp. 1-6.
P. J. Lawrenson, J. M. Stephenson, P. T. Blenkinsop, J. Corda, & N. N. Fulton, Variable-Speed Switched Reluctance Motors, 4 Jul. 1980, vol. 127, pp. 253-265.
B. J. Covey, B-1 Secondary Power Subsystem, Oct. 1-3, 1974, pp. 1-8.

*Primary Examiner*—A. D. Pellinen
*Assistant Examiner*—Robert L. Hoover
*Attorney, Agent, or Firm*—Gerald B. Hollins; Thomas L. Kundert

[57] ABSTRACT

An integrated aircraft power unit providing the electrical and other forms of energy needed during auxiliary power unit operating conditions-while the aircraft is on the ground, and also providing airborne or emergency power including high altitude flight emergency conditions power wherein the power unit uses an oxidant supply carried by the aircraft. In this high altitude operating condition the power unit provides lower electrical output, but lower losses and improved efficiency over previous power units. The disclosed power unit includes separate electromechanical transducers or motor generator devices coupled to a segregated pair of rotational shaft members, one for the inlet or compressor fan and one for the outlet or exhaust turbine fan with electrical coupling and then friction clutch coupling of these shafts accomplished for low altitude high energy output operation of the power unit. The described power unit is also capable of providing these aircraft energy needs with a minimum of physical changes from conventional integrated aircraft power units.

20 Claims, 2 Drawing Sheets

AIRCRAFT POWER UNIT WITH ELECTIVE MECHANICAL COUPLING

RIGHTS OF THE GOVERNMENT

The invention described herein may be manufactured and used by or for the Government of the United States for all governmental purposes without the payment of any royalty.

BACKGROUND OF THE INVENTION

This invention relates to the field of aircraft energy supply apparatus of both the auxiliary and emergency supply types.

A need for non-propulsion engine associated moderate quantities of electrical and other forms of energy in an aircraft has been recognized since the early days of aviation. Somewhat later in time, many World War II aircraft, especially the multi engine aircraft of this era, were provided with a small gasoline engine driven direct current generator which could supply electrical energy for starting of the propulsion engines, battery charging, and even a limited degree of communications and flight systems energization.

In the field of modern commercial airline equipment this supplying of auxiliary energy has evolved into many aircraft being self sufficient for indefinite periods when located on the ground, that is, these aircraft include apparatus providing engine starting, ground use air conditioning, communications, control, and illumination energy without the use of tether connections to permanent or portable external equipment. This same apparatus is also often made capable of supporting flight systems operation and emergency engine restarting sequences while the aircraft is in flight.

In this more modern equipment, the earlier-used single cylinder gasoline engine driven DC generator has evolved into a light-weight turbine driven apparatus that is capable of providing not only direct current electrical energy, but also multiple phased alternating current electrical energy, hydraulic pressure, compressed air and other energy forms to its host aircraft. In this modern embodiment the auxiliary power unit (APU) of earlier usage has evolved into an integrated power unit (IPU) which provides not only the energy needs for normal ground experience with the aircraft, but also is capable of emergency and safety use in the air as well.

The patent art includes a number of documents which are of general background interest with respect to the present invention. Included in these patents are U.S. Pat. No. 2,223,703 issued to H. C. A. Potez, patent which is concerned with an auxiliary service plant for an aircraft and in which either of two aircraft engines can be used to drive a bank of auxiliary load devices such as hydraulic pumps and generators. Since the Potez apparatus is not concerned with a high altitude and low altitude capable power unit, a ready distinction between the present invention and the Potez apparatus is apparent.

The patent art also includes U.S. Pat. No. 3,591,843 issued to one Helment Friedrich and concerned with an apparatus for starting one or several aircraft engines and for driving associated auxiliary equipment. Overrunning clutches and the like provide for driving the Frederich auxiliary equipment from the higher speed running of the multiple engines and selective cross coupling between these engines permits starting one engine from the other. Since the Friedrich apparatus is also not concerned with a high altitude and low altitude operable power unit, a ready distinction between the present invention and the disclosure of Friedrich is apparent.

The Patent art also includes a number of patents relating to magnetically operable couplings for axially aligned rotating shafts. Included in these patents are U.S. Pat. No. 4,446,392 issued to R. L. Jaeschke; U.S. Pat. No. 4,808,869 issued to N. L. Koop and U.S. Pat. No. 5,036,368 issued to Hroaki Nakamura. Since none of these coupling arrangements is concerned with a high altitude and low altitude operable aircraft power unit, the apparatus disclosed therein, although possibly useful in the present invention power unit, is not in itself significant with respect to the overall thrust of applicant's invention.

The art of general background interest with respect to the present invention also includes a Society of Automotive Engineers Inc. publication from the National Aeronautics and Space Engineering and Manufacturing meeting held at Los Angeles Calif., Oct. 4, 1965 to Oct. 8, 1965, an article titled "Integrated Secondary Power Systems" and identified with the SAE number 650828. This article was authored by Palmer R. Wood and William R. Spragins of the Air Research Manufacturing Division of the Garret Corporation and describes a number of accessory drive systems along with the advantages and disadvantages of each. Since the Wood and Spragins article is also not concerned with a high altitude and low altitude operating integrated power system a ready distinction with the present invention is apparent.

SUMMARY OF THE INVENTION

The present invention provides a low altitude and high altitude operable integrated aircraft power unit of improved high altitude efficiency, improved component lifetime, and enhanced load response time. The invention includes a mechanical decoupling arrangement between the IPU inlet compressor shaft and the outlet turbine fan shaft along with selection of a single large mechanical to electrical transducer or a pair of smaller mechanical to electrical transducers for generating the IPU electrical output energy. In the two smaller transducer arrangements the invention contemplates starting motor usage of the two transducers for both initial power unit start-up and for shaft velocity synchronization immediately prior to a shaft coupling event.

It is therefore an object of the present invention to provide an integrated aircraft power unit for supplying both large low altitude or ground power needs of the host aircraft and also for supplying a lesser level of output energy during high altitude operation.

It is another object of the invention to provide an aircraft power unit having higher efficiency high altitude operation.

It is another object of the invention to provide an aircraft integrated power unit wherein the redundancy and safety of a two mechanical to electrical transducer or two generator configuration is possible.

It is another object of the invention to provide a low inertia, low energy-loss integrated power unit having smaller electrical output capacity in one operating mode than in a second operating mode.

It is another object of the invention to provide an aircraft integrated power unit wherein high altitude operation is supported by an aircraft carried supply of oxidant material.

It is another object of the invention to provide an aircraft integrated power unit wherein electrical energy coupling between power unit inlet and outlet shafts may be used during high altitude to low altitude operating transitions.

It is another object of the invention to provide a integrated power unit having divisable-at-will input compressor and output turbine fan shafts.

It is another object of the invention to provide an aircraft integrated power unit wherein low altitude start-up can be accomplished by either a single one or a pair of electrical to mechanical rotational transducers.

It is another object of the invention to provide an aircraft integrated power unit for both low altitude and high altitude operation in which the inlet compressor fan is protected from high temperature abuse during high altitude non-compressor-operating periods of power unit usage.

Additional objects and features of the invention will be understood from the following description and claims and the accompanying drawings.

These and other objects of the invention are achieved by a high altitude, high efficiency turbine energized aircraft integrated power unit apparatus comprising the combination of:

a bearing mounted first rotatable shaft member having a hot gas drivable turbine blade apparatus mechanically coupled therewith;

hot gas generator means including fuel and oxidant receiving combustion chamber apparatus disposed in hot gas communication with said turbine blade apparatus;

first electromechanical energy transducer means mechanically coupled with said first rotatable shaft member for communicating, at least unidirectionally, first shaft rotational mechanical energy with a flow of electrical energy;

a bearing mounted second rotatable shaft member having inlet air compressor blade means for said power unit disposed thereon;

second electromechanical energy transducer means mechanically coupled with said second rotatable shaft member for communicating, at least unidirectionally, second shaft rotational mechanical energy with a flow of electrical energy; and selectively actualable clutching means for mechanically interconnecting said first and second rotatable shaft members during predetermined operating conditions of said power unit apparatus.

DETAILED DESCRIPTION

Figure 1:
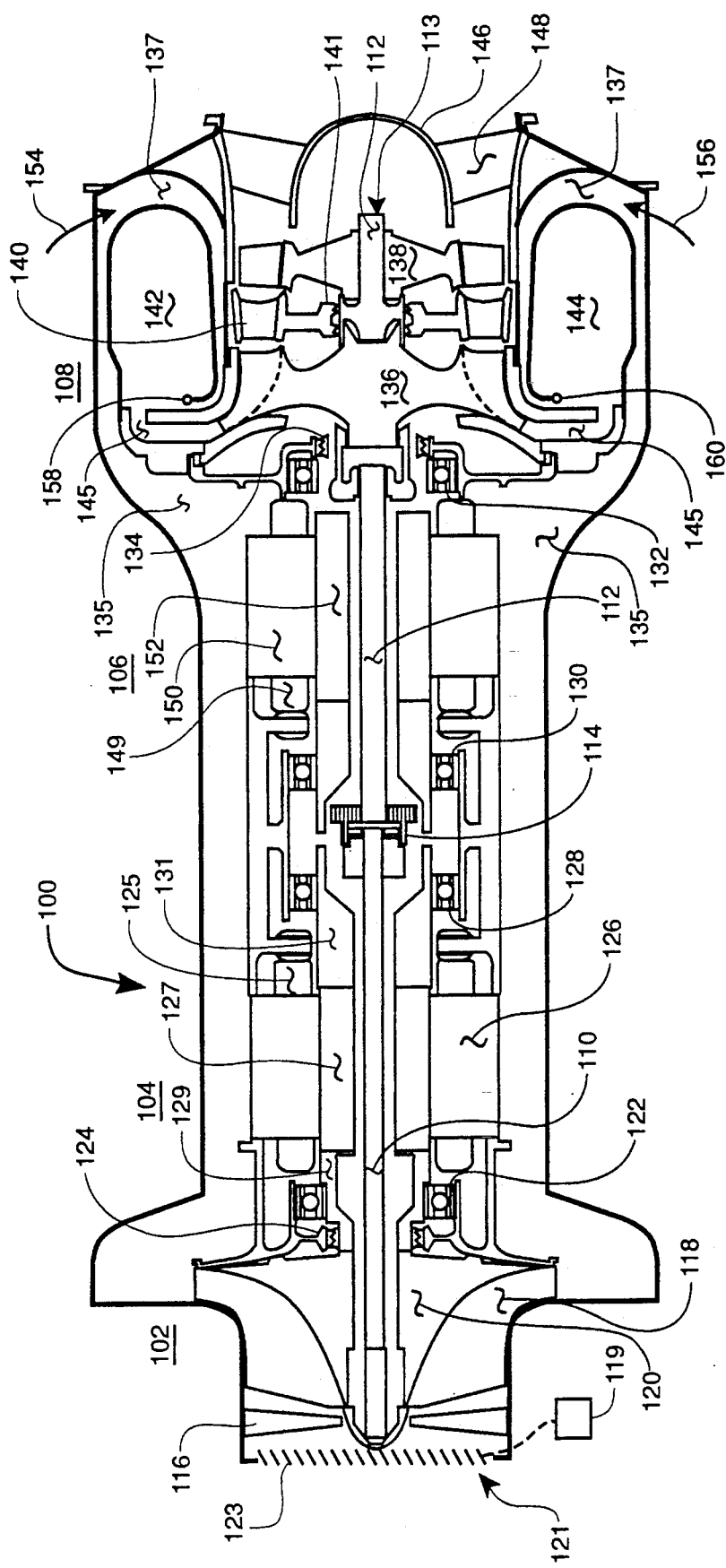
FIG. 1 shows a semi cross sectional view of an integrated power unit according to the invention.

The continued evolution of IPU systems and the aircraft supported by IPU systems has moved in the direction of a system which is operable both at lower altitudes where a dense atmosphere is capable of supplying the needed fuel combustion oxygen and is also operable at higher altitudes where a thin atmosphere requires use of a pressurized bottle of oxygen or other stored oxidant in order to accomplish combustion of power unit fuel. Although hydrazine and other exotic fuels have been employed for power unit operation on some military high performance aircraft (as is for example disclosed in the Patent of Raythell Wynn, U.S. Pat. No. 5,155,482 which is also assigned to the U.S. Air Force), it is often convenient to employ a liquid petroleum distillate such as JP4 and related fuels used by aircraft main propulsion engines for operating integrated power unit equipment.

In power unit equipment of this dual use or dual oxygen source nature it is recognized that a degree of inefficiency or waste is usually encountered when a low altitude turbine based apparatus is operated in a high altitude bottled oxygen mode since the inlet air compressor portion of the apparatus continues to function despite an absence of available air and an absence of need for the compressor's function.

Although an exclusion or shut-off of compressor inlet air is readily accomplished during this non atmospheric mode of operation, it is usually impractical to exclude all traces of inlet air or other gases from the compressor region of such a power unit so that unnecessary compressor drag, compressor abuse, fuel expenditure, and energy dissipation are frequently encountered in the high altitude operating mode.

Perhaps even more significantly, under some operating conditions the unused compressor fan in a dual mode power unit can be subjected to reverse-flowing hot gases from the high pressures in the exhaust turbine portion of the power unit and thereby elevated to damaging temperature levels when operated in the compressor spinning without inlet air mode.

A segregation of the inlet compressor fan shaft from the exhaust turbine shaft as provided in the present invention therefore provides an effective remedy for both the excessive energy consumption and compressor fan overheating problems of Prior low altitude/high altitude IPU embodiments. The present invention segregation also provides an IPU apparatus of lower mechanical inertia and thereby faster load response capabilities in the high altitude operating mode-where the need for an immediate emergency energy source to enable, for example, recovery of the host aircraft can be imperative.

This beneficial segregation is enabled by recognizing that during high altitude non atmospheric air operation of an IPU it is usually necessary to furnish only modest amounts of electrical and other energy to the aircraft since the emergency protocol for most aircraft call for their return to the dense air of lower altitudes before attempting a main engine restart or other high energy requirement operations. By way of this operating procedure therefore, it is found that an IPU energy source of for example, 150 kilowatts load capacity is satisfactory for meeting high altitude requirements of many aircraft while a source of energy in the 300 kilowatt range is necessary when engine restarting capability or ground based cooling is desired. In the present invention there is provided a system wherein a single power unit can economically supply each of these differing energy levels and yet be free of the energy waste and compressor abuse which has heretofore been experienced in a carried oxidant or bottled oxygen operating mode.

FIG. 1 in the drawings shows a semi-cross sectional view of an aircraft integrated power unit that is capable of these dual levels of electrical output energy along with efficient high altitude operation and normal air breathing low altitude operation. The FIG. 1 turbine driven integrated power unit 100 is shown to include an air inlet and compressor section 102. A first electric motor and or electric generator section 104. A second electric motor and or electric generator section 106 and a hot gas turbine section 108.

In the FIG. 1 turbine driven integrated power unit the compressor fan 120 and the rotor 127 of the first electric motor and or electric generator assembly 104 are mounted on a first rotating shaft member 110 that is received in the bearing assemblies 122 and 128 by way of intermediate rotating members 129 and 131 attached to the rotor 127. A frontal rotating seal 124 is used to exclude dust and other foreign matter from the bearing assembly 122 and interior portions of the first electric motor and or electric generator (motor generator) assembly 104. The electrical windings for this first motor generator assembly are indicated at 125 and the stator magnetic pole assembly is indicated at 126.

In the air inlet and compressor section 102 the compressor fan 120 cooperates with the mating stator assembly 118 to provide a flow of pressurized ambient air in the annular spaces 135 surrounding the motor generator assemblies 104 and 106 and leading into the hot gas turbine section 108. The director vanes 116 in the air inlet and compressor section 102 provide for a less turbulent air flow pattern at the compressor inlet port.

A shutter assembly, represented at 121, provides a means for excluding ambient air from the compressor fan 120 during high altitude operation of the FIG. 1 power unit-as is described below herein. The pivoting vanes 123 of the shutter assembly 121 are shown in the open or low altitude operation condition of the FIG. 1 power unit. By way of a remote actuator apparatus, indicated at 119, these vanes 123 may be pivoted into a sealed and ambient air excluding configuration during the below described high altitude operation of the FIG. 1 integrated power unit.

The rotor 152 of the second motor generator assembly 106 along with a pair of hot gas turbine fan blades 136 and 138 are received on a second rotating shaft member 112 in the FIG. 1 power unit. This second rotating shaft member 112 is in turn mounted on a second set of ball bearing, assemblies indicated at 130 and 132, which are protected from reverse flowing hot gases and other debris by the outlet rotating seal 134. A hot gas turbulence limiting vane assembly 140 is located between the turbine fan blades 136 and 138; this assembly includes a third rotating seal member indicated at 141.

A stationary shield 146 and vane assembly 148 is disposed at the outlet port of the FIG. 1 power unit for additional turbulence control and physical protection of the hot gas turbine section components. Within this hot gas turbine section 108 there is also disposed a plurality of combustion chambers indicated at 142 and 144— these chambers providing a flow of high temperature gases by way of the paths indicated at 145 to the turbine fan blades 136 and 138 during operation of the FIG. 1 power unit. Inlet air for the combustion chambers 142 and 144 is supplied from the annular spaces 135 by way of the paths 137 and fuel is supplied to the combustion chambers by way of conventional nozzle assemblies which are not shown in FIG. 1.

The windings 149 and stator assembly 150 of the second motor generator assembly 106 along with the rotor 152 are similar to the corresponding parts 125, 126, and 127 in the first motor generator assembly 104. As is indicated below, according to one embodiment of the invention each of these motor generator assemblies is capable of electrical energy output in the 150 kilowatt range and is capable of operating as either a motor or alternator.

Also shown in FIG. 1 are the arrows 154 and 156 which represent a flow of oxygen or other oxidizing material from sources external of the FIG. 1 power unit into the paths 137 leading into the combustion chambers 142 and 144. During high altitude operation of the FIG. 1 power unit the flow represented by the arrows 154 and 156 is used to replace the flow of ambient air oxidizing element in the paths 135.

Disposed intermediate the first and second rotating shaft members 110 and 112 in the FIG. 1 power unit is an electrically operable magnetic clutch member 114 having the capability of interconnecting the shafts 110 and 112 during certain portions of an operating cycle for the FIG. 1 power unit. In a related manner, the clutch 114 provides for isolation of the shafts 110 and 112 during certain other portions of an operating cycle for the FIG. 1 power unit.

The clutch 114 in the FIG. 1 power unit therefore enables two distinct operating modes in addition to certain operating advantages during transitions into and out of these operating modes. The clutch 114 is moreover a major distinction between the FIG. 1 power unit and more conventional power unit arrangements. This clutch 114 may be of a conventional magnetically operated friction clutch type including the torque limiting and other clutching arrangements disclosed in the above identified three U.S. patents relating to clutch mechanisms.

A first or conventional low altitude operating mode of the FIG. 1 power unit may be required for supplying loading ramp electrical energy for the aircraft hosting the FIG. 1 power unit. For this mode, electrical energy supplied to the motor generator assemblies 104 and 106 may be used either with or without energization of the clutch 114 to achieve initial start-up rotation of the shafts 110 and 112 in performing initial starting of the FIG. 1 power unit. During operation in this mode, pressurized air from the compressor section 102 is supplied by way of the paths 135 and 137 to the combustion chambers 142 and 144. Fuel and a source of fuel ignition are also supplied with fuel entrance occurring via combustion chamber nozzles 158 and 160. Electric motor rotation of the shafts 110 and 112 continues in this mode until the torque available from the turbine fans 136 and 138 is sufficient to drive the compressor section 102 toward a normal operation range of shaft rotation. At some point in this electric motor rotation, the clutch 114, if not initially energized, is energized in order that torque from the shaft 112 be supplied to the shaft 110 and drive the compressor section 102. During this ground-based operation, once near full operating speed is obtained, electrical energy can be withdrawn from the power unit by way of the windings 125 and 149 of the motor generator assemblies 104 and 106.

The motor generator assemblies 104 and 106 are preferably of the reluctance machine type and are used in conjunction with a semiconductor inverter assembly of variable frequency operating capability during motor operation of the assemblies 104 and 106. These motor generator assemblies are also used in conjunction with electrical rectifier assemblies during alternator operation. For the purpose of clarification therefore, the term electrical generator is herein used in a generic sense to indicate either an actual direct current generator or an alternating current alternator type of mechanical to electrical energy transducing machine. However, reluctance machines of the type herein contemplated are discussed in the technical article titled "Variable-Speed Switched Reluctance Motors" authored by P. J. Lawrenson et al and published in the "British Institution of Electrical Engineers Journal" in 1980 and identified, as paper 795B. and appearing at pages 93-106. The Lawrenson et al article is also published in the United States in the Proceedings of the Institute of Electrical and Electronic Engineers, at vol. 127, part B, no. Jul. 4, 1980 at pages 253-265. The contents of the Lawrenson et al papers are hereby incorporated by reference into the present patent document.

As will be apparent to persons skilled in the art, conventional wound rotor, electrical machines or other electrical to mechanical and mechanical to electrical transducer apparatus as is known in the electrical art may be used in the present power unit apparatus. In view of the availability of reliable high power semiconductor devices. The reluctance type of electrical machine has become the arrangement of choice in many modern day aircraft generating and starting applications; however, an exemplary use of such reluctance machines in aircraft generating and starting service is disclosed for example in the Patent of D.L. LaFuze, U.S. Pat. No. 5,198,972, which is also assigned to the U.S. Air Force. The freedom from friction brushes and rotor winding and other reliability and operating advantages contribute to this present day preference for the reluctance machine.

The conversion from electric motor to electric generator operation of the motor/generator assemblies 104 and 106 is accomplished in response to the attainment of some predetermined operating speed or a related condition in the FIG. 1 power unit. A control unit for accomplishing this conversion as well as for controlling these machines and other aspects of the FIG. 1 power unit through phases of each possible operating mode is shown in diagramic form in FIG. 2 of the drawings and is discussed below herein.

Operation of the FIG. 1 power unit in the so-far described low altitude or ground-based operating mode with the clutch 114 engaged may be continued indefinitely and so long as fuel and other necessary inputs are supplied to the power unit. Termination of such operation may of course be accomplished by fuel shut-off or other interruptions as are known in the art.

During a high altitude use of the FIG. 1 power unit as might be necessary to enable aircraft control functions, communications and so on, following a main engine high altitude failure, the clutch 114 is Preferably maintained in a non energized mode wherein the shafts 110 and 112 are rotationally disconnected. For this operating mode, initial start-up of the power unit may be accomplished by supplying battery sourced electrical energy to the motor generator assembly 106 to rotate the turbine fans 136 and 138 up to a velocity wherein the torque generated by combustion chamber gases is sufficient to further increase the operating speed to a normal value.

During this mode of operation it is contemplated that fuel ozidizing material is supplied from externally stored tanks or other sources as indicated by the arrows 154 and 156 in FIG. 1—since a sufficient quantity of atmospheric air is not available from the compressor section 102 at such higher altitudes. This mode of operation moreover contemplates that the vanes of the shutter assembly 121 are in a closed position and that little air flow occurs in the paths 135. In addition in this operating mode, only the motor and generator assembly 106, and not the assembly 104, is energized and the electrical energy available from the power unit is thus limited. Operation of the FIG. 1 power unit in this high altitude lower electrical energy output mode may again continue indefinitely until termination of fuel supply, oxygen supply or other termination events known in the art is accomplished.

It is of course desirable that the integrated power unit of FIG. 1 operate in the high altitude mode, wherein the shaft 110 remains stationary, without incurring a forward leakage flow of high temperature gases from the hot gas section 108. The presence of such a flow in the forward or leftward direction of the FIG. 1 apparatus can give rise to an overheating condition for the compressor fan 120, the electromechanical transducers or motor generators 104 and 106, and the bearings 122, 128 and 130, for example. Accomplishment of the high altitude operating mode with the vanes 123 of the shutter assembly 121 closed is of course of major assistance in accomplishing this non forward flow of hot gases. Indeed, however, it is the combination of damage from closed vane operation of the fan 120 together with this possible forward flow of gases from the hot gas section 108 to increase such damage that motivates a segregation of the shafts 110 and 112 in the high altitude operating mode of the present invention power unit. In addition to vane closure therefore the FIG. 1 apparatus may also be modified by an incorporation of supplemental vaning or valving apparatus adjacent the second motor generator 106 or even adjacent the hot gas turbine section 108 if necessary.

Presence of the clutch 114 and the two motor generator assemblies 104 and 106 also, provides for smooth transition between the high altitude operating mode and the low altitude operating mode of the FIG.1 power unit. Once disposed at a satisfactory lower altitude where ambient air is again available and where the full electrical output of the FIG. 1 apparatus is needed for accomplishing a propulsion engine restarting, the air inlet and compressor section 102 of the FIG. 1 power unit may be renergized.

A clutch-saving or clutch wear minimizing sequence for the clutch 114 includes first bringing the shaft 110 up to a substantial portion of its normal operating speed-by way of electrical energy flow coupling accomplished between the motor generator assembly 106-operating in the generator mode, and the motor generator assembly 104-operating in the electric motor mode. This sequence in effect provides an electrical energy coupling of the shaft 112 with the shaft 110. Once the shaft 110 achieves a substantial portion of its normal rotational velocity, energization of the clutch 114 may occur with minimal wear and tear on the clutch 114 frictional surfaces and minimum mechanical shock to the shafts 110 and 112 and the components attached thereto. Such energization of the clutch 114 is of course, accompanied by an opening of the vanes in the shutter assembly 121 and by terminating the flow of externally supplied oxidant material indicated by the arrows 154 and 156.

A reversed direction transition, that is a transition from low altitude to high altitude operation of the FIG. 1 power unit, if required, will also relate to the two motor generator assemblies 104 and 106 and the clutch 114. This transition involves ascertaining that the electrical load requirements of the aircraft are within the capability of the motor generator assembly 106, initiating the supply of oxidant material indicated by the arrows 154 and 156, and closing the vanes 123 of the shutter assembly 121.

Incorporation of the clutch 114 and the several operating modes for the FIG. 1 integrated power unit is accomplished with a minimum of physical changes to the normal configuration of a turbine driven aircraft power unit. In the FIG. 1 apparatus these changes include the addition of the two innermost shaft bearing assemblies 128 and 130 and preferably the presence of two motor generator assemblies 104 and 106.

It is of course possible to retain the use of a single electric motor and or electric generator assembly or even to use separate starter motor and generator assemblies if desired in the FIG. 1 apparatus. If the clutch 114 is arranged to be of such size and torque transmission capabilities as to endure actual energizations-when the shaft 110 is stationary and the shaft 112 is rotating at normal velocity in the high altitude operating mode, then the first motor generator assembly 104 may be eliminated in favor of a motor generator assembly at 106 which is capable of providing the full electrical output of the FIG. 1 power unit.

Alternately the first motor generator assembly 104 may be of some smaller size, that is determined only by its function as a starting motor, and with limited electrical generating capability, where it is desirable to vest a majority of the power unit's electrical generating capacity in the second motor generator assembly 106.

The FIG. 1 power unit may of course be provided with additional output shafts for driving hydraulic pumps, refrigerant compressors and other auxiliary load apparatus. According to one such arrangement these loads may be attached to the right hand end of the shaft 112 at 113 or alternately may be driven from points along the shaft 110 or shaft 112 by way of bevelled gearing and other mechanical coupling arrangements known in the art.

Figure 2:
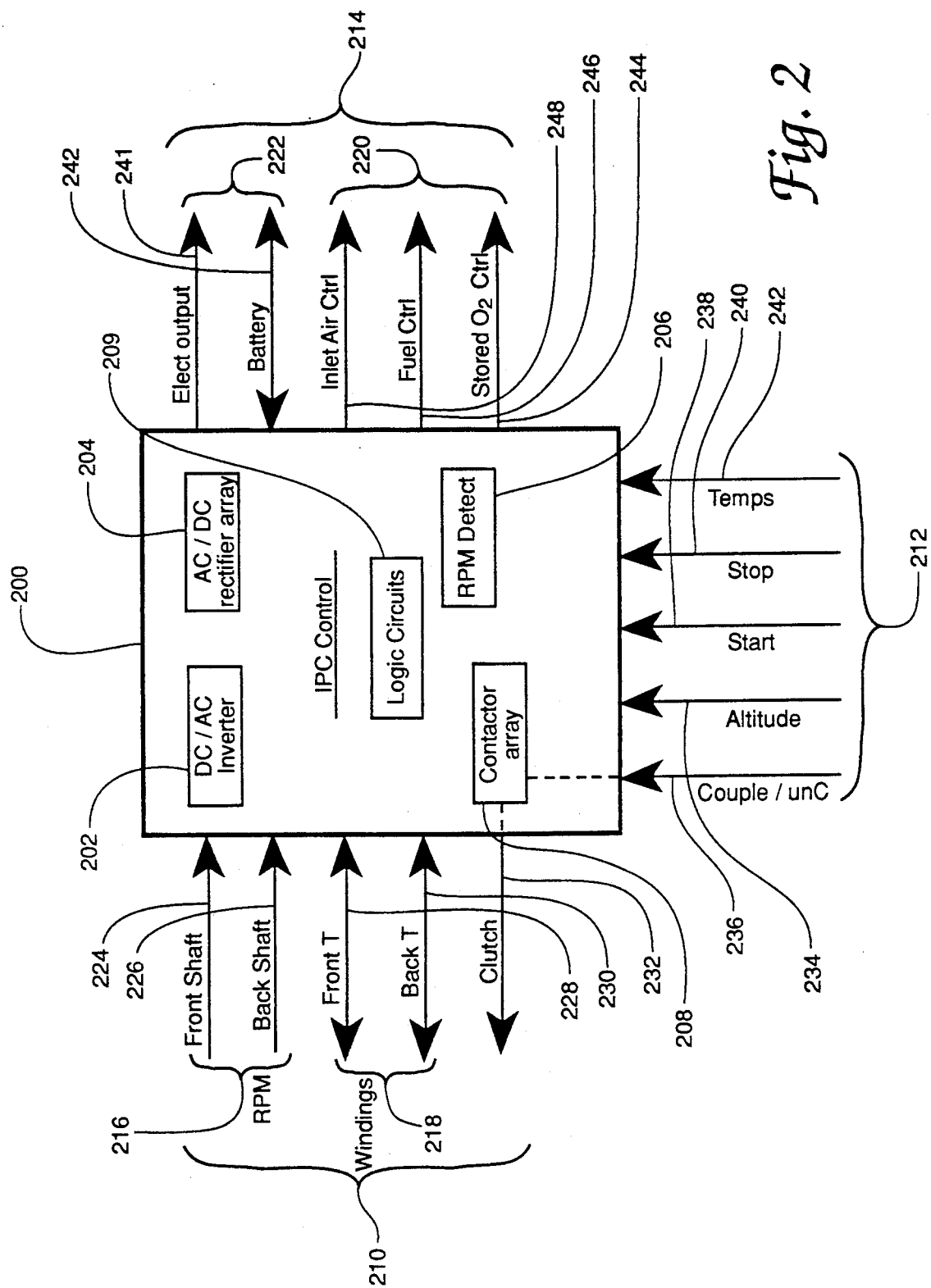
FIG. 2 shows a control unit and related input and output signals which may be used to operate the FIG. 1 integrated power unit.

FIG. 2 in the drawings shows a diagramatic representation of a control apparatus 200 which may be used to accomplish the different operating modes of the FIG. 1 integrated power unit. Preferably the control apparatus 200 includes a number of electromechanical and electronic circuit components and may also include a programmed digital computer in which software manipulation of the signals identified below is performed. Additionally, of course the control unit 200 may be largely accomplished with electromechanical or hydraulic or other control logic devices if desired.

As represented in FIG. 2 the control apparatus 200 is shown to include a DC to AC inverter 202, an AC to DC rectifier array 204, an electrical contactor array 208, and a revolutions per minute or shaft velocity detecting circuit 206, in addition to the logic circuitry 209.

In the controller apparatus 200 each of the identified subcircuits may include electronic components. Certain of these components are in the form of high current, high voltage diodes in the AC to DC rectifier array 204 and some in the form of silicon controlled rectifiers or thyrectors or high current transistors in the contactor array 208 and in the DC to AC inventor 202. The logic circuits 209 and the RPM detector 206 are amenable to being embodied in the form of a microprocessor computer that is appropriately programmed but may also be embodied in the form of dedicated electronic circuitry.

At 210 in FIG. 2 are shown the signal and power level communication paths connecting the control apparatus 200 and the FIG. 1 integrated power unit. At 212 in FIG. 2 are shown the control signals which provide communication between the host aircraft crew members and the integrated power unit of FIG. 1. Similarly at 214 are shown the energy related power and control signals which communicate between the integrated power unit of FIG. 1 and the host aircraft. The function of each of these groups of signals and individual signals within these groups will be understood from the following discussion.

In the group of signals 210, the pair of signals 216, that is the signals 224 and 226, are used to indicate the RPM velocity of the front and rear shafts 110 and 112 to the FIG. 1 power unit respectively. The pair of conductor paths 218 in the signals 210 accomplish bidirectional communication of electrical energy between the windings 125 and 149 of the motor generators 104 and 106 and the control apparatus 200.

In the group of signals 212 the signal along the path 236 allows the pilot or IPU operator to accomplish a manual coupling or uncoupling of the clutch 114, the signal along the path 234 communicates aircraft altitude to the control apparatus 200, the signals along the paths 238, and 240 allow manual starting and stopping of the FIG. 1 power unit, and the signal at 242 communicates operating temperature information from the FIG. 1 power unit to the control apparatus 200.

In the group of signals 214, the path 241 is used for the electrical energy output of the FIG. 1 inverter while the bi-directional path 242 is used to provide starting energy from a storage battery and charging energy for the storage battery. The group of signals at 220 provide fuel and oxidant control for the power unit 100. The signal 248 in this group 220 communicates with the remote actuator apparatus 119 in FIG. 1 and provides ambient inlet air control for the power unit 100. The signal at 246 provides control of the fuel supply to the combustion chambers 142 and 144 and the signal at 244 provides control for the stored supply of oxidant material of the paths 154 and 156 in FIG. 1.

During low altitude or ground based starting of the FIG. 1 IPU, energy from the aircraft battery along the path 242 flows through the DC to AC inverter 202 by way of one or both of the paths 228 and 230 to one or both of the motor generators 104 and 106 in the FIG. 1 IPU. The DC battery energy is appropriately modulated, preferably with an increasing frequency of modulation in the inverter 202 in order that the reluctance motor function of the transducers 104 and 106 cause the shafts 110 and 112 to increase in rotational velocity. When the RPM detector circuit 206 determines the presence of a predetermined velocity for the shafts 110 and 112, the battery path through the inverter 202 and a portion of the contactor array 208 is opened. In addition at this time an inverter energy output power connection between the winding paths 228 and 230 and the output path 241 is closed in the contactor array 208. This low altitude or ground based operating sequence is enabled by a low altitude signal on the path 234 and by appropriate start and stop signal conditions along the paths 238 and 240. Fuel flow and ignition in the combustion chambers 142 and 144 are enabled by appropriate fuel and inlet air signals along the paths 248 and 246.

Termination of this ground based operation may initiate with a stop signal along the path 240 which interrupts the supply of fuel by way of the path 246 and removes the power unit from the aircraft bus by way of an opening change in the electrical contactor array 208.

During this ground powered operating cycle, electrical energy from the paths 228 and 230 may also be applied through the rectifier array 204, which may include suitable voltage adjusting transformers, to provide battery charging along the path 242.

The control signals illustrated in the FIG. 2 drawing are also capable of initiating and terminating a high altitude starting of the FIG. 1 IPU and of accomplishing a high altitude to low altitude operating transition for the FIG. 1 power unit. The RPM detector circuit 206 in the FIG. 2 control apparatus may be arranged to respond to either or both of the shaft 110 and 112 rotational velocities and may be operated from either a conventional tachometer generator device attached to the shafts 110 and 112 respectively but not shown in FIG. 1.

Operation of the FIG. 1 IPU in a high altitude to low altitude transition of course, involves receiving energy along the paths 230 in FIG. 2 and returning a portion of this energy through the DC to AC inverter 202 and the contactor array 208 to the paths 228 to the motor generator 104 in order to accomplish the above described electrical coupling of the shafts 110 and 112.

Cooperative operation of the control apparatus 200 and the power unit 100 during other possible operating modes of the FIG. 1 apparatus is believed to be within the knowledge of persons skilled in the related electrical art in view of the detailed description of the FIG. 1 apparatus and its operation above and is therefore omitted from additional description in the present text.

The present invention therefore provides an improved aircraft integrated power unit that is capable of high efficiency operation in both low altitude and high altitude operating environments and which is also capable of preventing damage to portions of the power unit apparatus during the high altitude operating mode wherein portions of the power unit are unused and are thereby susceptable to physical and thermal damage and efficiency decreasing energy losses.

While the apparatus and method herein described constitute a preferred embodiment of the invention, it is to be understood that the invention is not limited to this precise form of apparatus or method and that changes may be made therein without departing from the scope of the invention which is defined in the appended claims.

We claim:

1. High efficiency turbine energized aircraft integrated power unit apparatus comprising the combination of:
    a bearing mounted first rotatable shaft member having a hot gas drivable turbine blade apparatus mechanically coupled therewith;
    hot gas generator means including fuel and oxidant receiving combustion chamber apparatus disposed in hot gas communication with said turbine blade apparatus;
    first electromechanical energy transducer means mechanically coupled with said first rotatable shaft member for communicating, at least unidirectionally, first shaft rotational mechanical energy with a flow of electrical energy;
    a bearing mounted second rotatable shaft member having inlet air compressor blade means for said hot gas generator means disposed thereon;
    second electromechanical energy transducer means mechanically coupled with said second rotatable shaft member for communicating second shaft rotational mechanical energy with a flow of electrical energy;
    selectively actualable clutching means for mechanically interconnecting said first and second rotatable shaft members during predetermined operating conditions of said power unit apparatus.

2. The power unit apparatus of claim 1 further including selection means connected with said fuel and oxidant receiving combustion chamber apparatus for selecting between an ambient air, compressed by said inlet air compressor blade means first oxidant material, and a pressure stored source of second oxidant material in response to a power unit apparatus-hosting aircraft residing below and above a predetermined altitude range respectively.

3. The power unit apparatus of claim 2 wherein said selectively actualable clutching means includes electrically energizable clutch means connected with said selection means for rotationally connecting said first and second rotatable shaft members during first operating conditions of said power unit below said predetermined altitude range and rotationally isolating said shaft members during second operating conditions thereof above said predetermined altitude range;
    said first operating conditions comprising mechanical energizations of said second rotatable shaft member and said compressor blade means through said clutching means from said first rotatable shaft member, combustion with said ambient air first oxidant material in said combustion chamber apparatus, and generation of power unit electrical output energy in at least one of said first and second electromechanical energy transducer means;
    said second operating conditions comprising rotational isolation of said first and second rotatable shaft members, quiescence of said compressor blade means, fuel combustion with said pressure stored source of second oxidant material, and generation of power unit electrical output energy in said first electromechanical energy transducer means.

4. The power unit apparatus of claim 3 wherein said first and second electromechanical energy transducer means each comprise electrical generators and wherein said first operating conditions comprise partial generation of said power unit electrical output energy in each of said electrical generators.

5. The power unit apparatus of claim 4 wherein said electrical generators are of unequal electrical capacity with said first rotatable shaft electromechanical energy transducer electrical generator being of larger electrical capacity and being capable of generating a total electrical output of said power unit apparatus and also of generating electrical energy for driving said second electromechanical energy transducer as a starting motor for said second rotatable shaft member and said compressor blade means prior to connection of said rotatable shaft members via said clutching means.

6. The power unit apparatus of claim 4 further including electrical control circuit means for operating said electrical generators as electric motors during start-up rotation of said first and second rotatable shaft members.

7. The power unit apparatus of claim 6 wherein said electric motor operable electrical generators are reluctance machine electromechanical energy transducers.

8. The power unit apparatus of claim 6 wherein said selection means further includes first and second rotatable shaft member rotation sensor means for reconnecting said shaft members and re-establishing said first operating conditions in said power unit apparatus in response to said hosting aircraft descending from an oxygen diminished high altitude to a combustion oxygen inclusive lower altitude.

9. The power unit apparatus of claim 1 wherein said first and second rotatable shaft members are axially aligned, with said inlet air compressor blade means being disposed at an inlet air end of said axially aligned shafts, said hot gas drivable turbine blade apparatus disposed at an exhaust gas end of said axially aligned shafts, and wherein said apparatus includes an electrically energizable clutch member disposed between adjacent ends of said shafts.

10. The power unit apparatus of claim 1 wherein said fuel is a liquid petroleum distillate.

11. The method of achieving efficient high and low altitude operation in an aircraft power unit comprising the steps of:
   supporting inlet port compressor fan and outlet port turbine fan elements of said aircraft power unit on clutch-coupleable rotationally segregated inlet and outlet shafts in said power unit;
   coupling an energizing flow of hot gasses from an oxidizable fuel burning combustion chamber apparatus to said outlet port turbine fan elements during high and low altitude operation of said aircraft power unit;
   selecting compressor fan pressurized ambient air as an oxidizing element for said oxidizable fuel during low altitude dense air operation of said aircraft power unit and choosing a stored supply of oxidant material for oxidizing element use during high altitude thin air operation of said aircraft power unit;
   said selecting step including clutch coupling of said inlet and outlet shafts, with said turbine fan energizing said compressor fan and supplying said ambient air oxidizing material to said combustion chamber apparatus during said low altitude dense air operation of said aircraft power unit and
   said selecting step also including clutch decoupling of said inlet and outlet shafts, and an attending de-energizing of said compressor fan during said high altitude thin air operation of said aircraft power unit;
   generating an electrical energy output of said aircraft power unit from turbine fan derived rotational mechanical energy received via said outlet shaft.

12. The method of claim 11 wherein said generating step includes generating a first limited quantity of electrical energy from rotational mechanical energy received on said outlet shaft from said turbine fan and generating a second limited quantity of electrical energy from rotational mechanical energy received on said inlet shaft via said clutch coupling from said outlet shaft.

13. The method of claim 12 wherein said first and second limited quantities of electrical energy are each between zero and one hundred fifty kilowatts.

14. The method of claim 11 wherein said generating step includes generating a total electrical energy output of said aircraft power unit in a single energy transducing machine and from turbine fan rotational mechanical energy received on said outlet shaft.

15. The method of claim 11 further including the steps of providing start-up rotational mechanical energy for said inlet and outlet shafts from electrical generator machines connecting with said inlet and outlet shafts and operating as electrical starting motors.

16. The method of claim 11 further including the steps of prefacing clutch coupling of said inlet and outlet shafts with one of the steps of determining that each of said shafts is either in a condition of zero rotational velocity or determining that each of said shafts is rotating at substantially a same rotational velocity; and
   achieving said same velocity rotation from electrical energy flow coupling of said shafts via an electric generator and electric motor combination.

17. The method of claim 16 wherein said steps of providing said same velocity rotation includes driving an electric generator from said outlet shaft and rotating said inlet shaft up to substantially the velocity of said outlet shaft with an electric motor coupled thereto.

18. The method of claim 17 wherein said driving and rotating steps include energizing a first reluctance motor/generator machine as an electric generator and energizing a second reluctance motor/generator machine as an electric motor.

19. The method of claim 11 further including the step of electrically coupling said inlet shaft to comparable rotational velocity with said outlet shaft rotational velocity via an electrically coupled electric motor and electric generator attending a high altitude to low altitude aircraft maneuver portion of a propulsion engine re-starting sequence.

20. An efficient, high altitude turbine-fan energized aircraft auxiliary power and aircraft emergency power generating integrated power unit comprising the combination of:
   hot gas energizable turbine fan apparatus having a first rotatable shaft member mechanical energy output;
   a first generator/motor reluctance electrical machine mechanically coupled with said first rotatable shaft member;
   ambient inlet air compressor fan apparatus having a second rotatable shaft member mechanical energy input and a pressurized air flow output;
   a second generator/motor reluctance electrical machine mechanically coupled with said second rotatable shaft member;
   hot gas generator means including oxidizable fuel and oxidant combining combustion chamber apparatus disposed in hot gas-flow communication with said turbine fan apparatus;
   a host aircraft carried stored supply of oxidant element;
   oxidant determining means for selecting said compressor fan pressurized air flow as an oxidizing element for said oxidizable fuel during lower altitude dense air operation of said integrated power unit and said host aircraft carried stored supply of oxidizing element for said oxidizable fuel during higher altitude rarefied air operation of said integrated power unit;
   an electrically energizable electromechanical clutch member having mechanical energy input and output members connecting with said first and second rotatable shaft members respectively;
   electrical control circuit means interconnected with said electromechanical clutch member, said first and second generator/motor reluctance electrical machines, first and second shaft rotational sensors, a source of power unit start-up electrical energy, power unit load apparatus, said oxidant determining means and host aircraft altitude sensing means, for:

mechanically joining said first and second rotatable shaft members via said electromechanical clutch member during low altitude zero shaft revolution startup and running of said power unit, mechanically segregating said shaft members thereby de-energizing said compressor fan apparatus and said second shaft member by said electromechanical clutch member, enabling a flow of said aircraft stored oxidizing element during compressor fan denergized high altitude operation of said power unit, coupling said second shaft member with said first shaft member via a flow of electrical energy in said generator/motor reluctance machines prior to a rotating first shaft to quiescent second shaft electromechanical clutch connection thereof, connecting said first and second generator/motor reluctance machines in electrical parallel and in electrical energizing relationship with said power unit load apparatus during said mechanically joined low altitude operation of said power unit, and connecting said first generator/motor reluctance machine in electrical energizing relationship with said power unit load apparatus during high altitude operation of said power unit.

* * * * *

UNITED STATES PATENT AND TRADEMARK OFFICE
CERTIFICATE OF CORRECTION

PATENT NO. : 5,309,029

DATED : May 3, 1994

INVENTOR(S) : Earl M. Gregory et al

It is certified that error appears in the above-identified patent and that said Letters Patent is hereby corrected as shown below:

Column 4, line 37, "Prior" should not be capitalized.

Column 4, line 58, "based" should be --proximate--.

Column 5, line 2, "102. A" should be --102, a--.

Column 5, line 3, "104. A" should be --104, a--.

Column 5, line 27, "a" should be deleted.

Column 5, line 43, the comma should follow "assemblies".

Column 5, line 62, "nozzle assemblies which are not shown" should be
   --nozzles shown typically at 158 and 160--.

Column 7, line 1, "alternator" should be enclosed in parentheses.

Column 7, line 2, "However" should be deleted.

Column 7, line 2, "reluctance" should be capitalized.

Column 7, line 6, "and" should be replaced by a comma.

Column 7, line 7, the comma should precede "identified".

Column 7, line 8, the first period should be deleted.

Column 7, line 11, "no. Jul. 4, 1980" should be --no. 4, Jul. 1980--.

Column 7, line 20, --needed-- should precede "reliable".

Column 7, line 21, "devices. The" should be --devices, the--.

Column 7, line 52, "Preferably" should not be capitalized.

UNITED STATES PATENT AND TRADEMARK OFFICE
CERTIFICATE OF CORRECTION

PATENT NO. : 5,309,029
DATED : May 3, 1994
INVENTOR(S) : Earl M. Gregory et al

It is certified that error appears in the above-identified patent and that said Letters Patent is hereby corrected as shown below:

Column 8, line 27, --tending-- should precede "to".

Column 8, line 36, the comma should be deleted.

Column 9, line 62, "inventor" should be --inverter--.

Column 10, line 13, "to" should be --of--.

Column 11, line 13, "either" should be deleted.

Signed and Sealed this

Fifteenth Day of November, 1994

Attest:

BRUCE LEHMAN

Attesting Officer

Commissioner of Patents and Trademarks